(12) United States Patent
Wang et al.

(10) Patent No.: US 12,150,056 B2
(45) Date of Patent: Nov. 19, 2024

(54) COMMUNICATION METHOD AND RELATED DEVICE (71) Applicant: HUAWEI TECHNOLOGIES CO., LTD., Guangdong (CN)

(72) Inventors: Hong Wang, Beijing (CN); Baokun Shan, Shenzhen (CN); Odile Rollinger, Cambridge (GB); Yan Wang, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 17/671,385

(22) Filed: Feb. 14, 2022

(65) Prior Publication Data
US 2022/0167273 A1 May 26, 2022

Related U.S. Application Data (63) Continuation of application No. PCT/CN2020/099857, filed on Jul. 2, 2020.

(30) Foreign Application Priority Data

Aug. 15, 2019 (CN) .......................... 201910755656.7

(51) Int. Cl.
*H04W 52/02* (2009.01)
*H04L 5/00* (2006.01)
*H04W 68/00* (2009.01)

(52) U.S. Cl.
CPC ....... *H04W 52/0229* (2013.01); *H04L 5/0053* (2013.01); *H04W 68/005* (2013.01)

(58) Field of Classification Search
CPC ........... H04W 52/0229; H04W 68/005; H04W 52/028; H04W 52/0216; H04W 68/00;
(Continued)

(56) References Cited

U.S. PATENT DOCUMENTS

2019/0200296 A1   6/2019   Liu et al.
2020/0169446 A1*  5/2020   Chen .................... H04B 7/0617
(Continued)

FOREIGN PATENT DOCUMENTS

CN    108702707 A    10/2018
CN    109309555 A    2/2019
(Continued)

OTHER PUBLICATIONS

Ericsson, "Service Based WUS Groups, Common WUS and Paging Multiplexing," 3GPP TSG-RAN WG2 #106, R2-1907912, Reno, USA, May 13-17, 2019, 10 pages.
(Continued)

*Primary Examiner* — Abdullahi Ahmed
(74) *Attorney, Agent, or Firm* — Fish & Richardson P.C.

(57) ABSTRACT

Example communication methods and apparatus are described. One example method includes receiving a first parameter by a terminal device from a first device, where the first parameter corresponds to first wake-up signal (WUS) configuration information in at least one piece of WUS configuration information, and the first WUS configuration information includes information about a first WUS time-frequency resource. The terminal device determines the first WUS time-frequency resource based on the first parameter, and receives a first WUS from a second device on the first WUS time-frequency resource, where the first WUS is used to wake up the terminal device. In this method, the terminal device can determine the first WUS time-frequency resource based on the first parameter received from the first device, and then receive the first WUS from the second device on the first WUS time-frequency resource.

18 Claims, 4 Drawing Sheets

(58) Field of Classification Search
CPC ........... H04W 72/044; H04W 52/0225; H04W 72/51; H04L 5/0053; Y02D 30/70
See application file for complete search history.

(56) References Cited

U.S. PATENT DOCUMENTS

| | | | |
|---|---|---|---|
| 2020/0196242 A1* | 6/2020 | Höglund | H04W 8/08 |
| 2022/0022137 A1* | 1/2022 | Xue | H04W 24/08 |
| 2022/0086759 A1* | 3/2022 | Höglund | H04W 68/005 |
| 2022/0095226 A1* | 3/2022 | Chang | H04W 52/0229 |
| 2022/0417851 A1* | 12/2022 | Priyanto | H04W 52/0235 |

FOREIGN PATENT DOCUMENTS

| | | |
|---|---|---|
| CN | 109429318 A | 3/2019 |
| CN | 109661021 A | 4/2019 |
| CN | 109923904 A | 6/2019 |
| CN | 109923914 A | 6/2019 |
| WO | 2019063336 A1 | 4/2019 |
| WO | 2019095323 A1 | 5/2019 |
| WO | 2019125748 A1 | 6/2019 |
| WO | 2020114483 A1 | 6/2020 |

OTHER PUBLICATIONS

Extended European Search Report issued in European Application No. 20852695.4 on Sep. 21, 2022, 13 pages.
Huawei, HiSilicon, "Assistance Indication for WUS Grouping," 3GPP TSG-SA2 Meeting #134, S2-1908076, Sapporo, Japan, Jun. 24-28, 2019, 44 pages.
Huawei, "Consideration on UE Group Wake Up Signal (WUS), " 3GPP TSG-RAN WG3 Meeting #106, R3-196606, Reno, USA, Nov. 18-22, 2019, 8 pages.
Huawei, HiSilicon, "Discussion on UE Paging Probability for WUS," 3GPP TSG CT WG1 Meeting #121, C1-198231, Reno, USA, Nov. 11-15, 2019, 8 pages.
Qualcomm Incorporated, "Text Proposal for WUS Description in TS 36.304," 3GPP TSG RAN WG2 #109-e, R2-2000307, 24 Feb.-Mar. 6, 2020, 12 pages.
3GPP TS 24.301 V16.1.1 (Jun. 2019), "3rd Generation Partnership Project; Technical Specification Group Core Network and Terminals;Non-Access-Stratum (NAS) protocol for Evolved Packet System (EPS); Stage 3(Release 16)," Jun. 2019, 548 pages.
3GPP TS 25.401 V15.0.0 (Jun. 2018), "3rd Generation Partnership Project;Technical Specification Group Radio Access Network;UTRAN overall description(Release 15)," Jun. 2018, 64 pages.
3GPP TS 36.213 V13.14.0 (Jun. 2019), "3rd Generation Partnership Project;Technical Specification Group Radio Access Network;Evolved Universal Terrestrial Radio Access (E-UTRA); Physical layer procedures (Release 13)," Jun. 2019, 395 pages.
3GPP TS 36.304 V15.4.0 (Jun. 2019), "3rd Generation Partnership Project; Technical Specification Group Radio Access Network; Evolved Universal Terrestrial Radio Access (E-UTRA); User Equipment (UE) procedures in idle mode (Release 15)," Jun. 2019, 55 pages.
3GPP TS 36.331 V15.6.0 (Jun. 2019), "3rd Generation Partnership Project; Technical Specification Group Radio Access Network; Evolved Universal Terrestrial Radio Access (E-UTRA); Radio Resource Control (RRC); Protocol specification (Release 15)," Jun. 2019, 960 pages.
3GPP TS 38.331 V15.6.0 (Jun. 2019), "3rd Generation Partnership Project; Technical Specification Group Radio Access Network; NR; Radio Resource Control (RRC) protocol specification(Release 15)," Jun. 2019, 519 pages.
Office Action issued in Chinese Application No. 201910755656.7 on Jun. 16, 2021, 23 pages (with English translation).
PCT International Search Report and Written Opinion issued in International Application No. PCT/CN2020/099857 on Sep. 7, 2020, 11 pages (partial English translation).
Qualcomm, "Remaining issues of 6.2.6.3 Wake-up signal," 3GPP TSG RAN WG1 Meeting #93, R1-1807528, Busan, Korea, May 21-25, 2018, 3 pages.
RAN2, "LS on assistance indication for WUS grouping," 3GPP TSG-RAN WG2 Meeting #106, R2-1908260, Reno, Nevada, USA, May 13-17, 2019, 1 page.
SA2, "[Draft] Reply LS on assistance indication for WUS grouping," 3GPP TSG-SA2 Meeting #134, S2-1908147, Sapporo, Japan, Jun. 24-28, 2019,1 page.

* cited by examiner

COMMUNICATION METHOD AND RELATED DEVICE

CROSS-REFERENCE TO RELATED APPLICATIONS

This application is a continuation of International Application No. PCT/CN2020/099857, filed on Jul. 2, 2020, which claims priority to Chinese Patent Application No. 201910755656.7, filed on Aug. 15, 2019. The disclosures of the aforementioned applications are hereby incorporated by reference in their entireties.

TECHNICAL FIELD

The present invention relates to the communication field, and specifically, to a communication method and a related device.

BACKGROUND

In a process of interaction between a network device and a terminal device, when the network device needs to send downlink data to the terminal device, the network device sends a paging message to the terminal device. The terminal device in an idle mode needs to monitor a physical downlink control channel (PDCCH) for scheduling the paging message.

To reduce time of monitoring the PDCCH by the terminal device, a discontinuous reception (DRX) mechanism is introduced. The terminal device only needs to monitor the PDCCH on one paging occasion (PO) in each DRX cycle.

One terminal device may determine a unique PO. However, a plurality of terminal devices may monitor the PDCCH on a same PO. In most cases, a network device does not simultaneously page a plurality of terminal devices on one PO. For one terminal device, regardless of whether the terminal device is paged by the network device, the terminal device needs to monitor a PDCCH on a corresponding PO. In this way, a large quantity of terminal devices monitor the PDCCH but are not paged. This increases power consumption of the terminal devices that are not paged. For example, one PO corresponds to 10 terminal devices. When only one of the 10 terminal devices is paged, all the 10 terminal devices need to monitor a PDCCH. In this way, all nine terminal devices that are not paged need to monitor the PDCCH. This increases power consumption of the nine terminal devices that are not paged.

SUMMARY

Embodiments of the present invention provide a communication method and a related device, to reduce power consumption of a terminal device in a process of interacting with a network device.

A first aspect of the embodiments of the present invention provides a communication method. The method includes: A terminal device receives a first parameter from a first device, where the first parameter corresponds to first wake-up signal WUS configuration information in at least one piece of WUS configuration information, and the first WUS configuration information includes information about a first WUS time-frequency resource; the terminal device determines the first WUS time-frequency resource based on the first parameter; and the terminal device receives a first WUS from a second device on the first WUS time-frequency resource, where the first WUS is used to wake up a terminal device. In this method, the terminal device can determine the first WUS time-frequency resource based on the first parameter received from the first device, and then receive the first WUS from the second device on the first WUS time-frequency resource. The terminal device is woken up only after receiving the first WUS, and then monitors a PDCCH on a first paging occasion PO. If the terminal device is not woken up, the terminal device does not need to monitor the PDCCH. In this way, a probability that the terminal device monitors the PDCCH but is not paged can be reduced, and power consumption of the terminal device can be reduced.

Optionally, with reference to the first aspect, in a first possible implementation of the first aspect, the receiving a first parameter from a first device includes: receiving an attach accept message or a tracking area update accept message from the first device, where the attach accept message or the tracking area update accept message includes the first parameter, the first device is a core network device, and the second device is an access network device.

Optionally, with reference to the first aspect, in a second possible implementation of the first aspect, the first parameter includes at least one of a first paging probability level, a first paging frequency, and a first paging probability of the terminal device; and the first paging probability is a probability that the terminal device is paged on a corresponding paging occasion PO. The first paging frequency may be a frequency at which the terminal device is paged within preset unit time, and the first paging probability level and the first paging probability may be determined based on the frequency at which the terminal device is paged within the preset unit time. The first parameter includes at least one of the first paging probability level, the first paging frequency, and the first paging probability of the terminal device. In this way, flexibility of configuring the first parameter can be improved.

Optionally, with reference to any one of the first aspect to the second possible implementation of the first aspect, in a third possible implementation of the first aspect, before the terminal device determines the first WUS time-frequency resource based on the first parameter, the method further includes: The terminal device receives the at least one piece of WUS configuration information from the second device, where the at least one piece of WUS configuration information includes the first WUS configuration information corresponding to the terminal device, and the first WUS configuration information includes the first WUS time-frequency resource. That the terminal device determines the first WUS time-frequency resource based on the first parameter includes: The terminal device determines a value range of the first parameter based on the first parameter and at least one preset threshold; and the terminal device determines the first WUS configuration information in the at least one piece of WUS configuration information based on the value range of the first parameter, where a preset correspondence exists between the value range of the first parameter and the first WUS configuration information. After determining the first WUS configuration information, the terminal device determines the first WUS time-frequency resource based on the first WUS configuration information. In a second possible implementation of the first aspect, the first parameter may be the first paging frequency or the first paging probability. The terminal device first determines the value range of the first parameter, then determines the first WUS configuration information, and then determines the first WUS time-frequency resource. In this way, the terminal device may determine, based on the first parameter, the first WUS time-frequency resource corresponding to the first parameter.

Optionally, with reference to any one of the first aspect to the second possible implementation of the first aspect, in a fourth possible implementation of the first aspect, before the terminal device determines the first WUS time-frequency resource based on the first parameter, the method further includes: The terminal device receives the at least one piece of WUS configuration information from the second device. That the terminal device determines the first WUS time-frequency resource based on the first parameter includes: The terminal device determines the first WUS configuration information in the at least one piece of WUS configuration information based on the first parameter, where a preset correspondence exists between the first parameter and the first WUS configuration information. After determining the first WUS configuration information, the terminal device determines the first WUS time-frequency resource based on the first WUS configuration information. In a third possible implementation of the first aspect, the first parameter may be the first paging probability level, and the terminal device may determine the first WUS configuration information based on the first paging probability level, to determine the first WUS time-frequency resource. In this way, the terminal device may determine, based on the first paging probability level, the first WUS time-frequency resource corresponding to the first paging probability level.

A second aspect of the embodiments of the present invention provides a communication method. The method includes: A second device receives a first paging message from a first device, where the first paging message includes an identifier of a terminal device and a first parameter, the first parameter corresponds to first wake-up signal WUS configuration information in at least one piece of WUS configuration information, and the first WUS configuration information includes information about a first WUS time-frequency resource; and the second device sends a first WUS to the terminal device on the first WUS time-frequency resource, where the first WUS is used to wake up the terminal device. The terminal device is woken up only after receiving the first WUS, and then monitors a PDCCH on a first paging occasion PO. If the terminal device is not woken up, the terminal device does not need to monitor the PDCCH. In this way, a probability that the terminal device monitors the PDCCH but is not paged can be reduced, and power consumption of the terminal device can be reduced.

Optionally, with reference to the second aspect, in a first possible implementation of the second aspect, before the second device receives the first paging message from the first device, the method further includes: The second device sends the at least one piece of WUS configuration information to the terminal device, where the at least one piece of WUS configuration information includes the first WUS configuration information corresponding to the terminal device, and the first WUS configuration information includes the first WUS time-frequency resource.

Optionally, with reference to the second aspect or the first possible implementation of the second aspect, in a second possible implementation of the second aspect, the first parameter includes at least one of a first paging probability level, a first paging frequency, and a first paging probability of the terminal device; and the first paging probability is a probability that the terminal device is paged on a corresponding paging occasion PO. The first paging frequency may be a frequency at which the terminal device is paged within preset unit time, and the first paging probability level and the first paging probability may be determined based on the frequency at which the terminal device is paged within the preset unit time. The first parameter includes at least one of the first paging probability level, the first paging frequency, and the first paging probability of the terminal device. In this way, flexibility of configuring the first parameter can be improved.

Optionally, with reference to the second possible implementation of the second aspect, in a third possible implementation of the second aspect, before the second device sends the first WUS to the terminal device on the first WUS time-frequency resource, the method further includes: The second device determines a value range of the first parameter based on the first parameter and at least one preset threshold; and the second device determines the first WUS configuration information in the at least one piece of WUS configuration information based on the value range of the first parameter, where a preset correspondence exists between the value range of the first parameter and the first WUS configuration information. After determining the first WUS configuration information, the second device determines the first WUS time-frequency resource based on the first WUS configuration information. In a second possible implementation of the second aspect, the first parameter may be the first paging frequency or the first paging probability. The second device first determines the value range of the first parameter, then determines the first WUS configuration information, and then determines the first WUS time-frequency resource. In this way, the second device may determine, based on the first parameter, the first WUS time-frequency resource corresponding to the first parameter.

Optionally, with reference to the second possible implementation of the second aspect, in a fourth possible implementation of the second aspect, before the second device sends the first WUS to the terminal device on the first WUS time-frequency resource, the method further includes: The second device determines the first WUS configuration information in the at least one piece of WUS configuration information based on the first parameter, where a preset correspondence exists between the first parameter and the first WUS configuration information. After determining the first WUS configuration information, the second device determines the first WUS time-frequency resource based on the first WUS configuration information. In a fourth possible implementation of the second aspect, the first parameter may be the first paging probability level, and the second device may determine the first WUS configuration information based on the first paging probability level, to determine the first WUS time-frequency resource. In this way, the second device may determine, based on the first paging probability level, the first WUS time-frequency resource corresponding to the first paging probability level.

Optionally, with reference to the third or fourth possible implementation of the second aspect, in a fifth possible implementation of the second aspect, the first device is a core network device.

A third aspect of the embodiments of the present invention provides a communication method. The method includes: A first device sends a first parameter to a terminal device, where the first parameter corresponds to first wake-up signal WUS configuration information in at least one piece of WUS configuration information, and the first WUS configuration information includes information about a first WUS time-frequency resource; and the first device sends a first paging message to a second device, where the first paging message includes an identifier of the terminal device and the first parameter, and the first paging message is used to indicate the second device to page the terminal device. The first device may separately send the first parameter to the terminal device and the second device, so that both the terminal device and the second device may determine the first WUS time-frequency resource based on the first parameter. In this way, it can be ensured that the second device sends a first WUS on the first WUS time-frequency resource, and the terminal device receives the first WUS on the first WUS time-frequency resource. The terminal device is woken up only after receiving the first WUS, and then monitors a PDCCH on a first paging occasion PO. If the terminal device is not woken up, the terminal device does not need to monitor the PDCCH. In this way, a probability that the terminal device monitors the PDCCH but is not paged can be reduced, and power consumption of the terminal device can be reduced.

Optionally, with reference to the third aspect, in a first possible implementation of the third aspect, the sending a first parameter to a terminal device includes: sending an attach accept message or a tracking area update accept message to the terminal device, where the attach accept message or the tracking area update accept message includes the first parameter.

Optionally, with reference to the third aspect or the first possible implementation of the third aspect, in a second possible implementation of the third aspect, the first parameter includes at least one of a first paging probability level, a first paging frequency, and a first paging probability of the terminal device; and the first paging probability is a probability that the terminal device is paged on a corresponding paging occasion PO. The first paging frequency may be a frequency at which the terminal device is paged within preset unit time, and the first paging probability level and the first paging probability may be determined based on the frequency at which the terminal device is paged within the preset unit time. The first parameter includes at least one of the first paging probability level, the first paging frequency, and the first paging probability of the terminal device. In this way, flexibility of configuring the first parameter can be improved.

Optionally, with reference to the second possible implementation of the third aspect, in a third possible implementation of the third aspect, the second device is an access network device.

A fourth aspect of the embodiments of the present invention provides a terminal device. The method includes: a receiving unit, configured to receive a first parameter from a first device, where the first parameter corresponds to first wake-up signal WUS configuration information in at least one piece of WUS configuration information, and the first WUS configuration information includes information about a first WUS time-frequency resource; and a processing unit, configured to determine the first WUS time-frequency resource based on the first parameter, where the receiving unit is further configured to receive a first WUS from a second device on the first WUS time-frequency resource, where the first WUS is used to wake up a terminal device. The terminal device can determine the first WUS time-frequency resource based on the first parameter received from the first device and then receive the first WUS from the second device on the first WUS time-frequency resource. The terminal device is woken up only after receiving the first WUS, and then monitors a PDCCH on a first paging occasion PO. If the terminal device is not woken up, the terminal device does not need to monitor the PDCCH. In this way, a probability that the terminal device monitors the PDCCH but is not paged can be reduced, and power consumption of the terminal device can be reduced.

Optionally, with reference to the fourth aspect, in a first possible implementation of the fourth aspect, the receiving unit is configured to receive an attach accept message or a tracking area update accept message from the first device, where the attach accept message or the tracking area update accept message includes the first parameter, the first device is a core network device, and the second device is an access network device.

Optionally, with reference to the first possible implementation of the fourth aspect, in a second possible implementation of the fourth aspect, the terminal device includes: the receiving unit is further configured to receive the at least one piece of WUS configuration information from the second device, where the at least one piece of WUS configuration information includes the first WUS configuration information corresponding to the terminal device, and the first WUS configuration information includes the first WUS time-frequency resource; the processing unit is further configured to determine a value range of the first parameter based on the first parameter and at least one preset threshold; and the processing unit is further configured to determine the first WUS configuration information in the at least one piece of WUS configuration information based on the value range of the first parameter, where a preset correspondence exists between the value range of the first parameter and the first WUS configuration information.

Optionally, with reference to the fourth aspect, in a third possible implementation of the fourth aspect, the terminal device includes: the receiving unit is further configured to receive the at least one piece of WUS configuration information from the second device; and the processing unit is further configured to determine the first WUS configuration information in the at least one piece of WUS configuration information based on the first parameter, where a preset correspondence exists between the first parameter and the first WUS configuration information.

A fifth aspect of the embodiments of the present invention provides a second device. The second device includes: a receiving unit, configured to receive a first paging message from a first device, where the first paging message includes an identifier of a terminal device and a first parameter, the first parameter corresponds to first wake-up signal WUS configuration information in at least one piece of WUS configuration information, and the first WUS configuration information includes information about a first WUS time-frequency resource; and a sending unit, configured to send a first WUS to the terminal device on the first WUS time-frequency resource, where the first WUS is used to wake up the terminal device. The second device sends the first WUS to the terminal device on the first WUS time-frequency resource, where the first WUS is used to wake up the terminal device. The terminal device is woken up only after receiving the first WUS, and then monitors a PDCCH on a first paging occasion PO. If the terminal device is not woken up, the terminal device does not need to monitor the PDCCH. In this way, a probability that the terminal device monitors the PDCCH but is not paged can be reduced, and power consumption of the terminal device can be reduced.

Optionally, with reference to the fifth aspect, in a first possible implementation of the fifth aspect, the second device includes: the sending unit is further configured to send the at least one piece of WUS configuration information to the terminal device, where the at least one piece of WUS configuration information includes the first WUS configuration information corresponding to the terminal device, and the first WUS configuration information includes the first WUS time-frequency resource.

Optionally, with reference to the fifth aspect or the first possible implementation of the fifth aspect, in a second possible implementation of the fifth aspect, the second device further includes: a processing unit, configured to determine a value range of the first parameter based on the first parameter and at least one preset threshold, where the processing unit is further configured to determine the first WUS configuration information in the at least one piece of WUS configuration information based on the value range of the first parameter, where a preset correspondence exists between the value range of the first parameter and the first WUS configuration information.

Optionally, with reference to the fifth aspect or the first possible implementation of the fifth aspect, in a third possible implementation of the fifth aspect, the second device further includes: a processing unit, configured to determine the first WUS configuration information in the at least one piece of WUS configuration information based on the first parameter, where a preset correspondence exists between the first parameter and the first WUS configuration information.

A sixth aspect of the embodiments of the present invention provides a first device. The first device includes: a sending unit, configured to send a first parameter to a terminal device, where the first parameter corresponds to first wake-up signal WUS configuration information in at least one piece of WUS configuration information, and the first WUS configuration information includes information about a first WUS time-frequency resource, where the sending unit is further configured to send a first paging message to a second device, where the first paging message includes an identifier of the terminal device and the first parameter, and the first paging message is used to indicate the second device to page the terminal device. The first device may separately send the first parameter to the terminal device and the second device, so that both the terminal device and the second device may determine the first WUS time-frequency resource based on the first parameter. In this way, it can be ensured that the second device sends a first WUS on the first WUS time-frequency resource, and the terminal device receives the first WUS on the first WUS time-frequency resource. The terminal device is woken up only after receiving the first WUS, and then monitors a PDCCH on a first paging occasion PO. If the terminal device is not woken up, the terminal device does not need to monitor the PDCCH. In this way, a probability that the terminal device monitors the PDCCH but is not paged can be reduced, and power consumption of the terminal device can be reduced.

Optionally, with reference to the fifth aspect, in a first possible implementation of the fifth aspect, the sending unit is further configured to send an attach accept message or a tracking area update accept message to the terminal device, where the attach accept message or the tracking area update accept message includes the first parameter.

A seventh aspect of the embodiments of the present invention provides a terminal device. The terminal device includes a processor and a memory, the memory stores program instructions, and the processor is configured to execute the program instructions stored in the memory, to perform the communication method according to any one of the first aspect and the possible implementations of the first aspect.

An eighth aspect of the embodiments of the present invention provides a second device. The second device includes a processor and a memory, the memory stores program instructions, and the processor is configured to execute the program instructions stored in the memory, to perform the communication method according to any one of the second aspect and the possible implementations of the second aspect.

A ninth aspect of the embodiments of the present invention provides a computer-readable storage medium, including program instructions. When the program instructions are run on a computer device, the computer device is enabled to perform the communication method according to any one of the first aspect and the possible implementations of the first aspect.

A tenth aspect of the embodiments of the present invention provides a computer-readable program medium, including program instructions. When the program instructions are run on a computer device, the computer device is enabled to perform the communication method according to any one of the second aspect and the possible implementations of the second aspect.

The embodiments of the present invention provide a communication method and a related device. The method includes: A terminal device receives a first parameter from a first device, where the first parameter corresponds to first wake-up signal WUS configuration information in at least one piece of WUS configuration information, and the first WUS configuration information includes information about a first WUS time-frequency resource; the terminal device determines the first WUS time-frequency resource based on the first parameter; and the terminal device receives a first WUS from a second device on the first WUS time-frequency resource, where the first WUS is used to wake up a terminal device. In this method, the terminal device can determine the first WUS time-frequency resource based on the first parameter received from the first device, and then receive the first WUS from the second device on the first WUS time-frequency resource. After receiving the first WUS, the terminal device monitors a PDCCH on a first paging occasion PO. If the terminal device is not woken up, the PDCCH does not need to be monitored. In this way, a probability that the terminal device monitors the PDCCH but is not paged can be reduced, and power consumption of the terminal device can be reduced.

DESCRIPTION OF EMBODIMENTS

The following clearly describes the technical solutions in the embodiments of the present invention with reference to the accompanying drawings in the embodiments of the present invention. It is clearly that the described embodiments are merely some rather than all of the embodiments of the present invention. All other embodiments obtained by persons skilled in the art based on the embodiments of the present invention without creative efforts shall fall within the protection scope of the present invention.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, terms such as "first" and "second" are intended to distinguish between similar objects, but do not necessarily indicate a specific order or sequence. It should be understood that the data used in such a way are interchangeable in proper circumstances, so that the embodiments described herein can be implemented in other orders than the order illustrated or described herein. In addition, terms "include" and "have" and any variations thereof are intended to cover non-exclusive inclusions, for example, a process, method, system, product, or device including a series of steps or modules is not necessarily limited to those clearly listed steps or modules, but may include other steps or modules that are not clearly listed or are inherent to these processes, methods, products, or devices.

In a process of interaction between a network device and a terminal device, when the network device needs to send downlink data to the terminal device, the network device sends a paging message to the terminal device. The terminal device monitors a PDCCH on a PO corresponding to the terminal device in each DRX cycle.

The terminal device may determine a paging frame (paging frame, PF) based on the DRX cycle and a unique identifier of the terminal device, and further determine a paging subframe. The paging subframe is a PO, and a system frame number (system frame number, SFN) of the PF is calculated by using the following formula:

SFN mod T=(T div N)*(UE_ID mod N), where T is the DRX cycle; N=min(T, nB), where nB=4T, 2T, T, T/2, T/4, T/8 . . . (where a value of nB is notified by the network device to the UE by using a system message); and UE_ID=international mobile subscriber identity (international mobile subscribe identification, IMSI) mod 1024.

One system frame includes 10 paging subframes. A paging subframe number corresponding to a PO may be obtained based on i_s, and i_s may be calculated according to the following formula:

i_s=floor(UE_ID/N)mod Ns, where UE_ID=IMSI mod 1024;N=min(T,nB), where nB=4T,2T,T,T/2, T/4,T/8 . . . ; and Ns=max(1,nB/T).

A number of a paging subframe on which monitoring needs to be performed is determined in Table 1 based on a calculated value of i_s:

TABLE 1

| Ns | PO (when i_s = 0) | PO (when i_s = 1) | PO (when i_s = 2) | PO (when i_s = 3) |
|---|---|---|---|---|
| 1 | 9 | N/A | N/A | N/A |
| 2 | 4 | 9 | N/A | N/A |
| 4 | 0 | 4 | 5 | 9 |

Based on the foregoing process, a unique PO may be determined for one terminal device, and the terminal device monitors a PDCCH on the PO. However, one PO may correspond to a plurality of terminal devices, to be specific, a plurality of terminal devices may monitor a PDCCH on a same PO. In most cases, a network device does not simultaneously page a plurality of terminal devices on one PO. However, for one terminal device, regardless of whether the terminal device is paged by the network device, the terminal device needs to monitor a PDCCH on each PO. In this way, a large quantity of terminal devices corresponding to a same PO monitor the PDCCH but are not paged. This increases power consumption of the terminal devices that are not paged. For example, one PO corresponds to 10 terminal devices. When only one of the 10 terminal devices is paged, all the 10 terminal devices need to monitor a PDCCH. In this way, all nine terminal devices that are not paged need to monitor the PDCCH. This increases power consumption of the nine terminal devices that are not paged.

Figure 1:
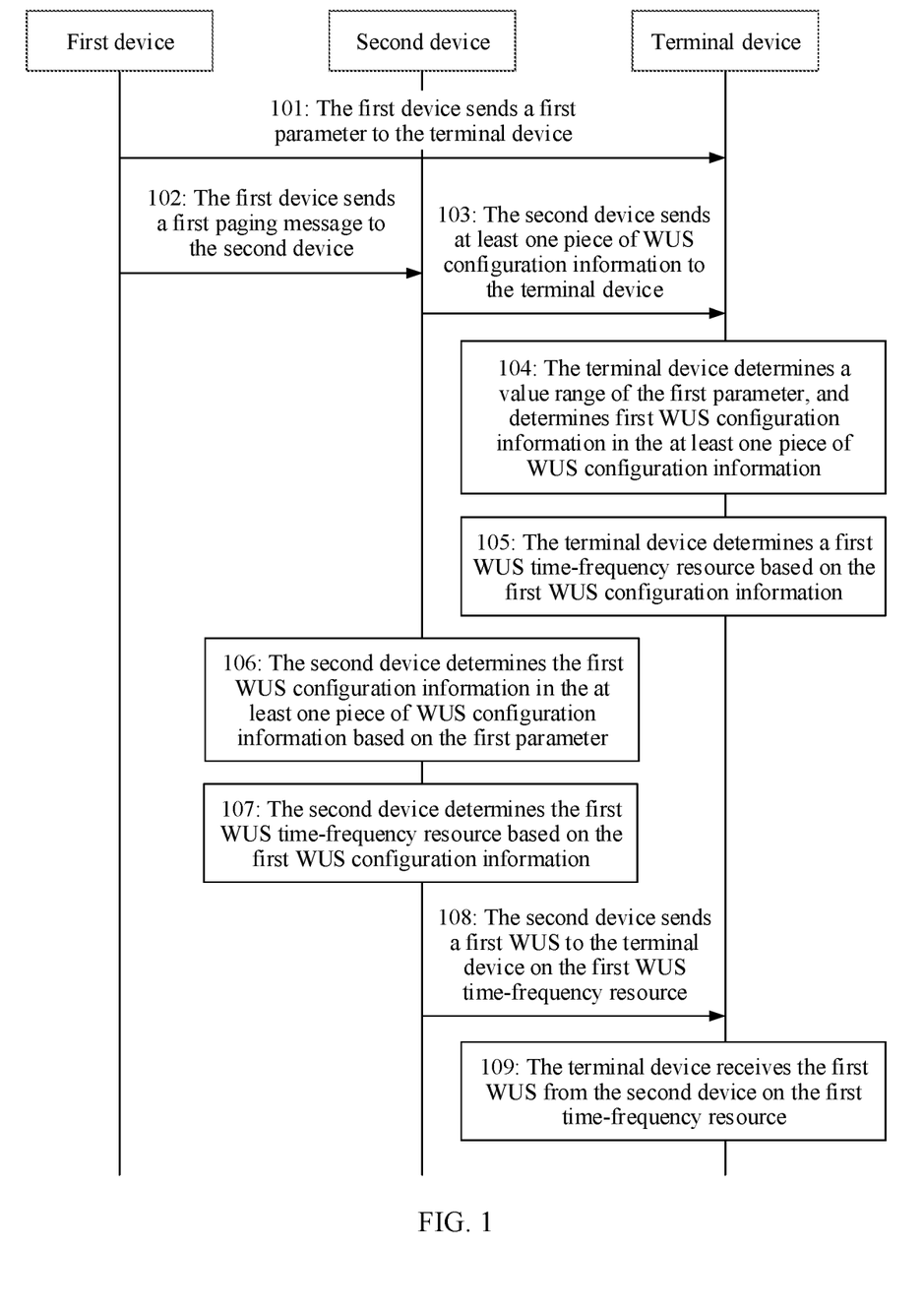
FIG. 1 is a schematic diagram of an embodiment of a communication method according to embodiments of the present invention.

Therefore, Embodiment 1 of the present invention provides a communication method. As shown in FIG. 1, the method may include the following steps.

101: A first device sends a first parameter to a terminal device.

The first device sends the first parameter to the terminal device, where the first parameter may be a first paging frequency and/or a first paging probability of the terminal device, the first paging frequency is a quantity of times that the terminal device is paged within unit time, and the unit time may be a preset time period. This is not specifically limited. For example, the first parameter may be 20 times/hour, indicating that the terminal device is paged 20 times within one hour. The first paging probability may be a probability that the terminal device is paged on a corresponding PO. For example, the first paging probability may be 20%, indicating that a probability that the terminal device is paged on a PO corresponding to the terminal device is 20%. The first paging probability may be determined by the first device based on probabilities that all terminal devices corresponding to one PO are paged within unit time. For example, 10 terminal devices correspond to one PO, a terminal device that is paged a maximum quantity of times within unit time in the 10 terminal devices is paged 100 times, and a terminal that is paged a minimum quantity of times is paged 20 times. In this case, the first device may determine that the first paging probability of the terminal device that is paged the maximum quantity of times is 100%, and the first paging probability of the terminal device that is paged the minimum quantity of times is 20%. The example is merely used to explain this application and shall not be construed as a limitation. The first parameter is used to indicate the terminal device to determine first wake-up signal (WUS) configuration information in at least one piece of WUS configuration information.

The first device may be a core network device, for example, a mobility management entity (MME) or an access and mobility management function (AMF) entity, but is not limited thereto. The terminal device may be user equipment (UE), an internet of things device, or the like, but is not limited thereto. In addition, the terminal device is regularly paged, and a frequency of being paged within a preset time period is fixed. For example, if the terminal device is paged 20 times from 9:00 to 10:00 on Jan. 1, 2010, the terminal device is also paged 20 times from 10:00 to 11:00 on Jan. 1, 2010. The example is merely used to explain this application and shall not be construed as a limitation.

It may be understood that, the first device may send the first parameter to the terminal device through forwarding by another device, and the another device includes a second device. To be specific, step 101 may be that the first device sends the first parameter to the second device, and then the second device sends the first parameter to the terminal device. This is not limited herein.

It should be noted that before the first device sends the first parameter to the terminal device, the first device needs to first obtain the first parameter. The first device may count a quantity of times that the terminal device is paged within preset unit time and record the quantity of times that the terminal device is paged within the preset unit time, and use the quantity as a value of the first parameter. For example, the preset unit time is one hour, the first device is paged 20 times within one hour, and the first device may count the value of the first parameter as 20. The example is merely used to explain this application and shall not be construed as a limitation.

For example, the first device may send an attach accept (attach accept) message or a tracking area update accept (tracking area update accept) message to the terminal device, where the attach accept message or the tracking area update accept message carries the first parameter.

102: The first device sends a first paging message to the second device.

The first device sends the first paging message to the second device, where the first paging message includes an identifier of the terminal device and the first parameter. The first paging message is used to indicate the second device to page the terminal device, the identifier of the terminal device is used by the second device to determine the terminal device, the first parameter may be the first paging frequency of the terminal device, and the first parameter is used to indicate the second device to determine the first WUS configuration information in the at least one piece of WUS configuration information.

The second device may be an access network device, for example, an evolved NodeB (E-UTRAN node B, eNB), a 5G gNodeB (gNB), or an evolved universal terrestrial radio access network (evolution universal mobile telecommunications system terrestrial radio access network, E-UTRAN).

103: The second device sends the at least one piece of WUS configuration information to the terminal device.

The second device sends the at least one piece of WUS configuration information to the terminal device, where the at least one piece of WUS configuration information includes at least the first WUS configuration information corresponding to the terminal device. The first WUS configuration information includes a first WUS time-frequency resource.

There is a correspondence between the at least one piece of WUS configuration information and the first parameter. Specifically, there may be a correspondence between the at least one piece of WUS configuration information and a value range of the first parameter. For example, the at least one piece of WUS configuration information includes K pieces of WUS configuration information. In the K pieces of WUS configuration information, any piece of WUS configuration information may be denoted as $WUS_j$ configuration information, where K is a positive integer, and j is a positive integer less than or equal to K. One piece of WUS configuration information has one index corresponding to the WUS configuration information. Corresponding WUS configuration information may be determined based on an index of any piece of WUS configuration information. One or more paging frequency thresholds may be preset. At least two value ranges may be determined based on the one or more thresholds, and each of the at least two value ranges corresponds to an index of one piece of WUS configuration information. The index can be explicit or implicit. In an explicit method, a value range of V corresponds to one determined index value, and one determined index value corresponds to one piece of WUS configuration information, as shown in Table 2. In an implicit method, the index of the WUS configuration information has no determined value, and may be represented in another implicit manner. For example, the K pieces of WUS configuration information are represented in a form of a list, and the list does not include a column of indexes of the WUS configuration information. The first row of the list implies that an index of the first piece of WUS configuration information is 1 . . . , and the $K^{th}$ row of the list implies that an index of the $K^{th}$ piece of WUS configuration information is K. The first piece of WUS configuration information to the $K^{th}$ piece of WUS configuration information in the list implicitly correspond to index values from 1 to K. The value of the first parameter may be denoted as V. When a value of V is determined, a value range corresponding to the value of V may be determined based on the value of V, so that an index of WUS configuration information corresponding to the value range is determined, and then the corresponding WUS configuration information is determined based on the index of the WUS configuration information. Correspondences among value ranges of V, indexes of WUS configuration information, and WUS configuration information may be shown in the following Table 2.

TABLE 2

| Value range of V | Index of the WUS configuration information | WUS configuration information |
|---|---|---|
| $V \leq T_1$ | Index of $WUS_1$ configuration information | $WUS_1$ configuration information |
| $T_1 < V \leq T_2$ | Index of $WUS_2$ configuration information | $WUS_2$ configuration information |
| . . . | . . . | . . . |
| $T_{M-1} < V \leq T_M$ | Index of $WUS_{K-1}$ configuration information | $WUS_{K-1}$ configuration information |
| $T_M < V$ | Index of $WUS_K$ configuration information | $WUS_K$ configuration information |

$T_1, T_2, \ldots, T_{M-1}$, and $T_M$ are preset thresholds, and a relationship between them may be $T_1 \leq T_2 \leq \ldots \leq T_{M-1} \leq T_M$. In a specific implementation process, value ranges of a plurality of Vs may correspond to one piece of WUS configuration information and an index of the WUS configuration information. For example, in Table 2, a plurality of rows in the first column correspond to a row in the second column and a row in the third column. The second device may send a system message to the terminal device, where the system message may include the M preset thresholds, for example, $T_1, T_2, \ldots, T_{M-1}$, and $T_M$.

In an actual implementation process, the index of the WUS configuration information may be a multi-level index. For example, a first-level index may include at least one second-level index. A first-level index may be determined based on the value range of the first parameter, and then a specific second-level index in the first-level index is determined according to a preset method. Each second-level index corresponds to one piece of determined WUS configuration information. That a second-level index in the first-level index is determined according to a preset method may be specifically that the second-level index in the first-level index is determined based on the identifier of the terminal device.

For example, the preset method may be: Second-level indexes are first numbered in a sequence from 1 to W, where B is a number of the second-level index corresponding to the terminal device; W is a quantity of second-level indexes included in the first-level index, and W is a positive integer; and M is a unique identifier, for example, a temporary mobile subscriber identity (S-TMSI) or an IMSI, of the terminal device. In this case, a calculation formula of B may be: B=M mod W+Q, where Q is a positive integer greater than or equal to zero and less than W, and mod is a modulo operation. The example is merely used to explain this application and shall not be construed as a limitation.

After the first-level index and the second-level index are determined according to the foregoing method, one piece of determined WUS configuration information may be determined based on the first-level index and the second-level index. For example, an index $WUS_K$ may be a first-level index, the first-level index may include at least one second-level index such as $WUS_{K1}$, $WUS_{K1}$, $WUS_{K3}$, ..., and each second-level index corresponds to one piece of WUS configuration information. After the first-level index is determined based on the value range of the first parameter, a specific corresponding second-level index is determined based on the identifier of the terminal device. Then, the WUS configuration information is determined based on Table 3. Table 3 is correspondences among first-level indexes, second-level indexes, and WUS configuration information. Table 3 is merely an example, and constitutes no limitation.

TABLE 3

| First-level index | Second-level index | WUS configuration information |
|---|---|---|
| $WUS_1$ | $WUS_{11}$ | WUS configuration information 1 |
|  | $WUS_{12}$ | WUS configuration information 2 |
|  | $WUS_{13}$ | WUS configuration information 3 |
| $WUS_2$ | $WUS_{21}$ | WUS configuration information 4 |
|  | $WUS_{22}$ | WUS configuration information 5 |
| ... | ... | ... |
|  | ... | ... |
|  | ... | ... |
|  | ... | ... |
| $WUS_K$ | $WUS_{K1}$ | ... |
|  | $WUS_{K2}$ | ... |

The second device may send a correspondence between the foregoing value range and the index of the WUS configuration information to the terminal device. After receiving the correspondence, the terminal device may determine the value range of V based on the value (V) of the first parameter, to determine an index of WUS configuration information and the corresponding WUS configuration information corresponding to the value range.

In another implementation, the configuration information may include two parts: correspondences between the first parameter and WUS indexes shown in Table 4, and correspondences between indexes of WUS configuration information and the WUS configuration information shown in Table 5.

TABLE 4

| Value range of V | Index of the WUS configuration information |
|---|---|
| $V \leq T_1$ | Index of $WUS_1$ configuration information |
| $T_1 < V \leq T_2$ | Index of $WUS_2$ configuration information |
| ... | ... |
| $T_{M-1} < V \leq T_M$ | Index of $WUS_{K-1}$ configuration information |
| $T_M < V$ | Index of $WUS_K$ configuration information |

Relationships between the indexes of the WUS configuration information and the WUS configuration information may be shown in the following Table 5. The index of the WUS configuration information may be implicit. For example, the WUS configuration information is provided in a form of a list, and a position of the WUS configuration information in the list implicitly indicates an index of the WUS configuration information.

TABLE 5

| WUS configuration number | Index of the WUS configuration information | WUS configuration information |
|---|---|---|
| 1 | Index of $WUS_1$ configuration information | $WUS_1$ configuration information |
| 2 | Index of $WUS_2$ configuration information | $WUS_2$ configuration information |
| ... | ... | ... |
| K − 1 | Index of $WUS_{K-1}$ configuration information | $WUS_{K-1}$ configuration information |
| K | Index of $WUS_K$ configuration information | $WUS_K$ configuration information |

The second device may send, to the terminal device, the correspondences between the value ranges of V and the indexes of the WUS configuration information shown in Table 4 and the relationships between the indexes of the WUS configuration information and the WUS configuration information shown in Table 5. After receiving the first parameter, the terminal device may determine the index of the WUS configuration information based on Table 4, and then determine the corresponding WUS configuration information based on Table 5.

The foregoing descriptions are merely an implementation. In an actual implementation process, the WUS configuration information may alternatively be directly determined based on the value range of the first parameter, without the step of determining the index of the WUS configuration information. This is not limited herein.

It should be noted that there is no time sequence between step 102 and step 103. The first device may send the first paging message to the second device after the second device sends the at least one piece of WUS configuration information to the terminal device.

104: The terminal device determines the value range of the first parameter, and determines the first WUS configuration information in the at least one piece of WUS configuration information.

In step 103, the terminal device may determine the value range of the first parameter based on the first parameter and the at least one preset threshold, and then determine the first WUS configuration information in the at least one piece of WUS configuration information based on the preset correspondence between the value range of the first parameter and the first WUS configuration information.

Optionally, in a possible implementation, the terminal device may determine, based on the first parameter and the at least one preset threshold, the value range of the first parameter, to determine an index of WUS configuration information corresponding to the value range, where the index of the WUS configuration information corresponding to the value range is an index of the first WUS configuration information. Then, the first WUS configuration information is determined based on the index of the WUS configuration information corresponding to the value range. For understanding, refer to step 103.

Optionally, in a possible implementation, the terminal device may determine, based on the first parameter and the at least one preset threshold, the value range of the first parameter, and then directly determine, based on the value range of the first parameter, the first WUS configuration information corresponding to the value range. For understanding, refer to step 103.

Optionally, in a possible implementation, the terminal device may determine, based on the first parameter and the at least one preset threshold, the value range of the first parameter, to determine a first-level index corresponding to the value range, where the first-level index may include at least one second-level index. The terminal device may determine the second-level index according to the preset method, and specifically may determine the second-level index in the first-level index based on the identifier of the terminal device. For understanding of the determining step, refer to step 103. Details are not described herein again. After the second-level index is determined, the first WUS configuration information may be determined based on the second-level index.

105: The terminal device determines the first WUS time-frequency resource based on the first WUS configuration information.

The first WUS configuration information includes information about the first WUS time-frequency resource, and the terminal device may determine the first WUS time-frequency resource based on the first WUS configuration information.

The first WUS time-frequency resource may include at least one of the following:

(1) maximum WUS duration information, where the maximum WUS duration information is used to indicate maximum sending duration of a wake-up signal WUS;
(2) a quantity of POs, where the quantity of POs is used to indicate a quantity of POs associated with one WUS;
(3) a quantity of UE groups, where the quantity of UE groups is used to indicate a quantity of UE groups associated with one WUS, or is used to indicate a quantity of UE groups associated with one PO;
(4) frequency position information, where the frequency position information is used to indicate a frequency position for sending the WUS; and in a possible implementation, the frequency position information may be used to indicate a frequency position for sending the WUS on a paging narrowband; and
(5) time position information, where the time position information is used to indicate a time position for sending the WUS; and in a possible implementation, the time position information may be used to indicate a time position for sending the WUS relative to a PO, for example, an end moment for sending the WUS and time of the associated first PO.

106: The second device determines the first WUS configuration information in the at least one piece of WUS configuration information based on the first parameter.

The second device may determine the value range of the first parameter based on the first parameter and the at least one preset threshold, and then determine the first WUS configuration information in the at least one piece of WUS configuration information based on the preset correspondence between the value range of the first parameter and the first WUS configuration information. For understanding of the determining process, refer to step 104. Details are not described herein again.

It should be noted that there is no time sequence between step 106 and step 104. The terminal device may first determine the first WUS configuration information, or the second device may first determine the first WUS configuration information.

107: The second device determines the first WUS time-frequency resource based on the first WUS configuration information.

The first WUS configuration information includes the information about the first WUS time-frequency resource, and the second device may determine the first WUS time-frequency resource based on the first WUS configuration information. The first WUS time-frequency resource is described in step 105. Details are not described herein again.

108: The second device sends a first WUS to the terminal device on the first WUS time-frequency resource.

After determining the first WUS time-frequency resource in step 107, the second device sends the first WUS to the terminal device on the first WUS time-frequency resource.

109: The terminal device receives the first WUS from the second device on the first time-frequency resource.

After determining the first WUS time-frequency resource in step 105, the terminal device receives the first WUS on the first WUS time-frequency resource. The first WUS is used to wake up the terminal device, and after the terminal device is woken up, the terminal device monitors a PDCCH on a first PO, where the first PO is a PO corresponding to the terminal device.

Embodiment 1 of this application provides the communication method. The method includes: The terminal device receives the first parameter from the first device, where the first parameter may be the first paging frequency of the terminal device, the first parameter corresponds to the first wake-up signal WUS configuration information in the at least one piece of WUS configuration information, and the first WUS configuration information includes the information about the first WUS time-frequency resource; the terminal device determines the first WUS time-frequency resource based on the first parameter; and the terminal device receives the first WUS from the second device on the first WUS time-frequency resource, where the first WUS is used to wake up the terminal device and enable the terminal device to monitor the physical downlink control channel PDCCH on the first paging occasion PO. In this method, the terminal device can determine the first WUS time-frequency resource based on the first parameter received from the first device, and then receive the first WUS from the second device on the first WUS time-frequency resource. After receiving the first WUS, the terminal device monitors the PDCCH on the first paging occasion PO. In this way, a probability that the terminal device monitors the PDCCH but is not paged can be reduced, and power consumption of the terminal device can be reduced.

In Embodiment 1 of this application, the value range corresponding to the frequency of paging the terminal device in the unit time may be determined based on the frequency of paging the terminal device in the unit time and the one or more preset thresholds, and the value range corresponds to the corresponding WUS. A plurality of terminal devices corresponding to a same PO may be paged at different frequencies within unit time. In this case, a plurality of terminals corresponding to one PO may correspond to different WUSs.

Therefore, this solution provided in Embodiment 1 of this application is equivalent to grouping a plurality of terminals corresponding to one PO based on different WUSs. In all terminal devices corresponding to one PO, only a corresponding terminal device that receives a corresponding WUS monitors a PDCCH, and not all terminal devices on the PO monitor the PDCCH. In this way, power consumption of a terminal device that is not paged can be reduced. Before this solution is implemented, the first device needs to determine that the second device and the terminal device support a WUS-based terminal device grouping mechanism. For example, the second device may send a first indication message to the first device, and the first device determines, based on the first indication message, that the second device supports WUS-based terminal device grouping. The terminal device may send a second indication message to the first device, and the first device may determine, based on the second indication message, that the terminal device supports WUS-based terminal device grouping. For example, the terminal device may carry the second indication message by using an attach request (attach request) message or a tracking area update request (tracking area update request).

Figure 2:
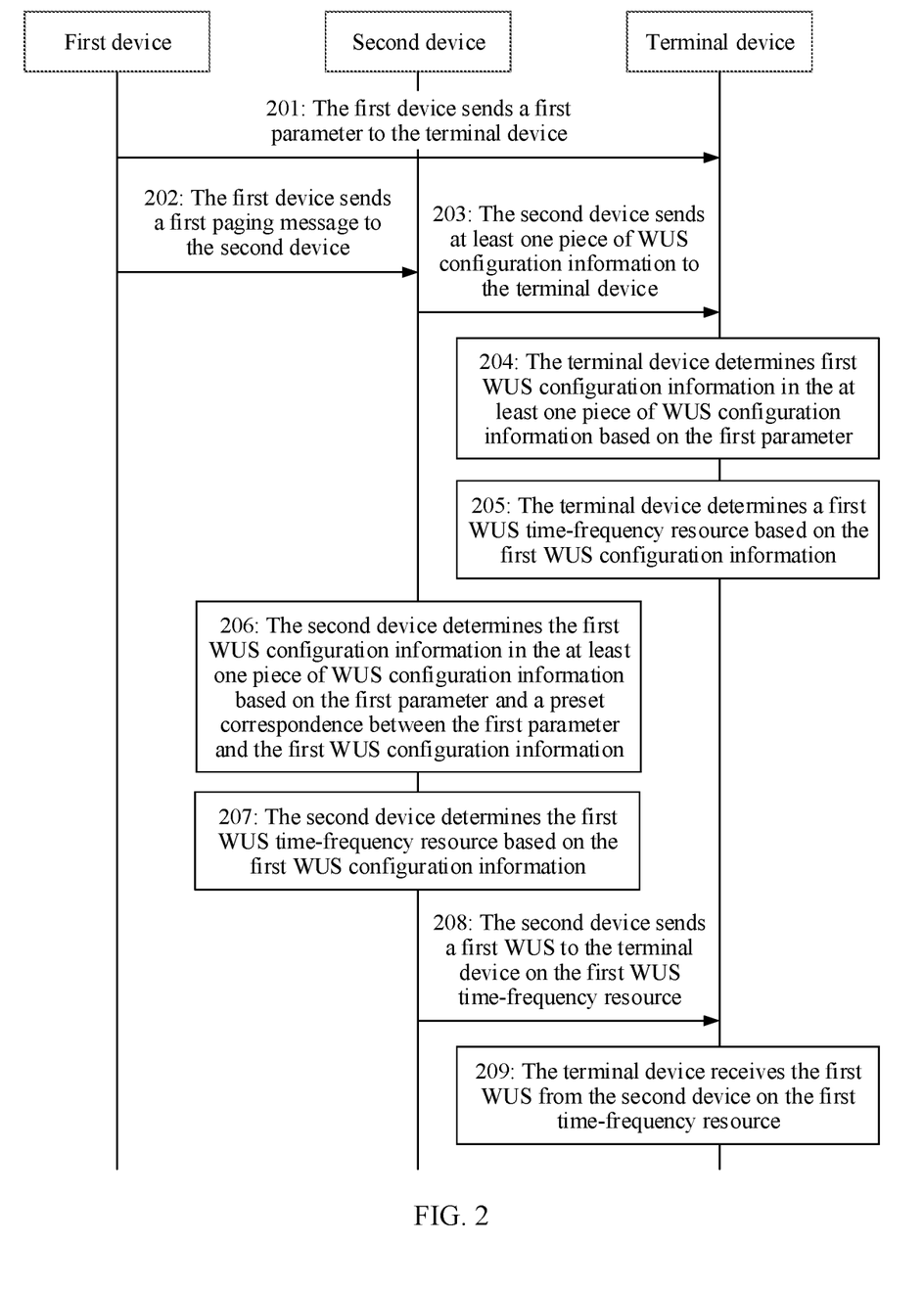
FIG. 2 is a schematic diagram of another embodiment of a communication method according to the embodiments of the present invention.

In Embodiment 1, the first parameter is the first paging frequency or the first paging probability of the terminal device, and the first paging frequency may be the quantity of times that the terminal device is paged within the unit time. The first paging frequency may be the probability that the terminal device is paged on the corresponding PO. Both the first paging frequency and the first paging probability may be represented by numerical values, and the value range may be determined based on the numerical values. In another implementation, the first parameter may alternatively be a first paging probability level of the terminal device, and the first paging probability level may indicate a probability level that the terminal device is paged within the unit time. The first paging probability level is determined by the first device based on the quantity of times that the terminal device is paged within the unit time. Embodiment 2 provides a communication method. As shown in FIG. 2, the method may include the following steps.

201: A first device sends a first parameter to a terminal device.

The first device sends the first parameter to the terminal device, where the first parameter may be a first paging probability level, the first paging probability level may be a paging probability level of the terminal device within unit time, and the first paging probability level is determined by the first device based on a quantity of times that the terminal device is paged within the unit time. The unit time may be a preset time period, which is not specifically limited. For example, the first parameter may indicate that the first paging probability level is low or high. For example, if the first device counts that the quantity of times that the terminal device is paged within one hour is less than or equal to 20 times, the first device determines that the paging probability level of the terminal device is low; or if the quantity of times that the terminal device is paged within one hour is greater than 20 times, the first device determines that the paging probability level of the terminal device is high. The first parameter may alternatively be another probability level, for example, a level 1, a level 2, or the like. The example is merely used to explain this application and shall not be construed as a limitation.

The first device may be a core network device, for example, an MME or an AMF, but is not limited thereto. The terminal device may be UE, an internet of things device, or the like, but is not limited thereto. The terminal device is regularly paged. A frequency of being paged within a preset time period is fixed. Therefore, a probability level of being paged within the preset time period is fixed.

It may be understood that, the first device may send the first parameter to the terminal device through forwarding by another device, and the another device includes a second device. To be specific, step 201 may be that the first device sends the first parameter to the second device, and then the second device sends the first parameter to the terminal device. This is not limited herein.

202: The first device sends a first paging message to the second device.

The first device sends the first paging message to the second device, where the first paging message includes an identifier of the terminal device and the first parameter. The first paging message is used to indicate the second device to page the terminal device, and the identifier of the terminal device is used by the second device to determine the terminal device. The first parameter may be the first paging probability level of the terminal device, and the first parameter is used to indicate the second device to determine first WUS configuration information in at least one piece of WUS configuration information. The second device may be an access network device, for example, an eNB, a gNB, or an E-UTRAN.

203: The second device sends the at least one piece of WUS configuration information to the terminal device.

The second device sends the at least one piece of WUS configuration information to the terminal device, where the at least one piece of WUS configuration information includes at least the first WUS configuration information corresponding to the terminal device. The first WUS configuration information includes a first WUS time-frequency resource.

There is a correspondence between the at least one piece of WUS configuration information and a paging probability level. For example, when the paging probability level is low or high, a correspondence between the at least one piece of WUS configuration information and the paging probability level may be shown in Table 6.

TABLE 6

| Paging probability level | WUS configuration information |
| --- | --- |
| Low | $WUS_1$ configuration information |
| High | $WUS_2$ configuration information |

In an actual implementation process, a plurality of paging probability levels may correspond to one piece of WUS configuration information. For example, when paging probability levels include five levels: highest, second highest, medium, second lowest, and lowest, correspondences between the paging probability levels and WUS configuration information may be shown in Table 7.

TABLE 7

| Paging probability level | WUS configuration information |
| --- | --- |
| Lowest or second lowest | $WUS_1$ configuration information |
| Medium | $WUS_2$ configuration information |

TABLE 7-continued

| Paging probability level | WUS configuration information |
| --- | --- |
| Second highest | $WUS_3$ configuration information |
| Highest | $WUS_4$ configuration information |

The second device may send the correspondences between the WUS configuration information and the paging probability levels to the terminal device. After receiving the correspondences, the terminal device may determine corresponding WUS configuration information based on the first paging probability level of the terminal device.

The correspondence between the at least one piece of WUS configuration information and the paging probability level is merely an example of an implementation, and constitutes no limitation on this application. In an actual implementation process, N paging probability levels may be set, where N is a positive integer. One or more paging probability levels may be set to correspond to one piece of WUS configuration information. This is not limited herein.

204: The terminal device determines the first WUS configuration information in the at least one piece of WUS configuration information based on the first parameter.

The terminal device determines the first WUS configuration information in the at least one piece of WUS configuration information based on the first parameter and a preset correspondence between the first parameter and the first WUS configuration information. For example, referring to step 203, if the first parameter is "low", it is determined, based on the correspondence between the at least one piece of WUS configuration information and the paging probability level, that the first WUS configuration information is the $WUS_1$ configuration information.

205: The terminal device determines the first WUS time-frequency resource based on the first WUS configuration information.

Refer to step 105 in Embodiment 1, and details are not described herein again.

206: The second device determines the first WUS configuration information in the at least one piece of WUS configuration information based on the first parameter and the preset correspondence between the first parameter and the first WUS configuration information.

The second device determines the first WUS configuration information in the at least one piece of WUS configuration information based on the first parameter and the preset correspondence between the first parameter and the first WUS configuration information. For understanding of the determining process, refer to step 204. Details are not described herein again.

It should be noted that there is no time sequence between step 206 and step 204. The terminal device may first determine the first WUS configuration information, or the second device may first determine the first WUS configuration information.

207: The second device determines the first WUS time-frequency resource based on the first WUS configuration information.

For understanding, refer to step 107 in Embodiment 1, and details are not described herein again.

208: The second device sends a first WUS to the terminal device on the first WUS time-frequency resource.

After determining the first WUS time-frequency resource in step 207, the second device sends the first WUS to the terminal device on the first WUS time-frequency resource.

209: The terminal device receives the first WUS from the second device on the first time-frequency resource.

After determining the first WUS time-frequency resource in step 205, the terminal device receives the first WUS on the first WUS time-frequency resource. The first WUS is used to wake up the terminal device, and enables the terminal device to monitor a PDCCH on a first PO, where the first PO is a PO corresponding to the terminal device.

Embodiment 2 of this application provides the communication method. The method includes: The terminal device receives the first parameter from the first device, where the first parameter may be the first paging probability level of the terminal device, the first parameter corresponds to the first wake-up signal WUS configuration information in the at least one piece of WUS configuration information, and the first WUS configuration information includes information about the first WUS time-frequency resource; the terminal device determines the first WUS time-frequency resource based on the first parameter; and the terminal device receives the first WUS from the second device on the first WUS time-frequency resource, where the first WUS is used to wake up the terminal device and enable the terminal device to monitor the physical downlink control channel PDCCH on the first paging occasion PO. In this method, the terminal device can determine the first WUS time-frequency resource based on the first parameter received from the first device, and then receive the first WUS from the second device on the first WUS time-frequency resource. After receiving the first WUS, the terminal device monitors the PDCCH on the first paging occasion PO. In this way, a probability that the terminal device monitors the PDCCH but is not paged can be reduced, and power consumption of the terminal device can be reduced.

Figure 3:
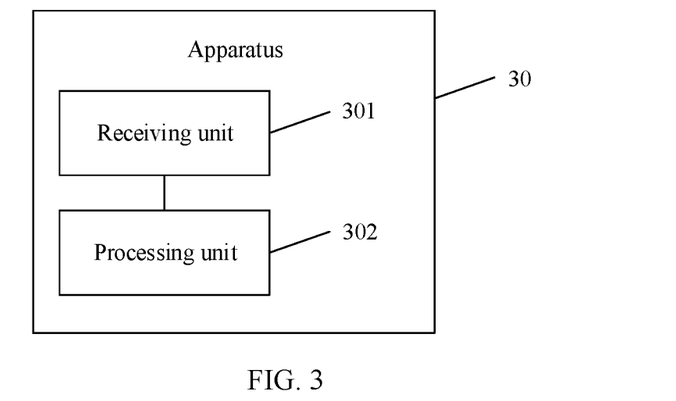
FIG. 3 is a schematic diagram of an embodiment of a terminal device according to the embodiments of the present invention.

Embodiment 3 of this application provides an apparatus 30. The apparatus 30 may be a terminal device, or may be a functional unit or an element, for example, a chip, in the terminal device. The terminal device is the terminal device in Embodiment 1 or Embodiment 2. As described in Embodiment 1, the terminal device may be UE, an internet of things device, or the like, but is not limited thereto. As shown in FIG. 3, the apparatus 30 may include:

a receiving unit 301, configured to receive a first parameter from a first device, where the first parameter corresponds to first wake-up signal WUS configuration information in at least one piece of WUS configuration information, and the first WUS configuration information includes information about a first WUS time-frequency resource; for understanding, refer to step 101 in Embodiment 1 or step 201 in Embodiment 2, and details are not described herein again, where the receiving unit 301 is further configured to receive a first WUS from a second device on the first WUS time-frequency resource, where the first WUS is used to wake up the terminal device, and after the terminal device is woken up, the terminal device monitors a physical downlink control channel PDCCH on a first paging occasion PO; for understanding, refer to step 109 in Embodiment 1 or step 209 in Embodiment 2, and details are not described herein again; and the receiving unit 301 is further configured to receive the at least one piece of WUS configuration information from the second device; for understanding, refer to step 103 in Embodiment 1 or step 203 in Embodiment 2, and details are not described herein again; and a processing unit 302, configured to determine the first WUS time-frequency resource based on the first parameter; for understanding, refer to step 104 and step 105 in Embodiment 1 or step 204 and step 205 in Embodiment 2, and details are not described herein again, where the processing unit 302 is further configured to determine a value range of the first parameter based on the first parameter and at least one preset threshold; for understanding, refer to step 104 in Embodiment 1, and details are not described herein again;

the processing unit 302 is further configured to determine the first WUS configuration information in the at least one piece of WUS configuration information based on the value range of the first parameter, where a preset correspondence exists between the value range of the first parameter and the first WUS configuration information; for understanding, refer to step 104 in Embodiment 1, and details are not described herein again;

the processing unit 302 is further configured to determine the first WUS time-frequency resource based on the first WUS configuration information; for understanding, refer to step 105 in Embodiment 1 or step 205 in Embodiment 2, and details are not described herein again; and the processing unit 302 is further configured to determine the first WUS configuration information in the at least one piece of WUS configuration information based on the first parameter, where a preset correspondence exists between the first parameter and the first WUS configuration information; for understanding, refer to step 204 in Embodiment 2, and details are not described herein again.

The apparatus 30 provided in Embodiment 3 lists only the receiving unit 301 and the processing unit 302. In actual production, there may be another functional module. This embodiment is merely an example, and constitutes no limitation.

Figure 4:
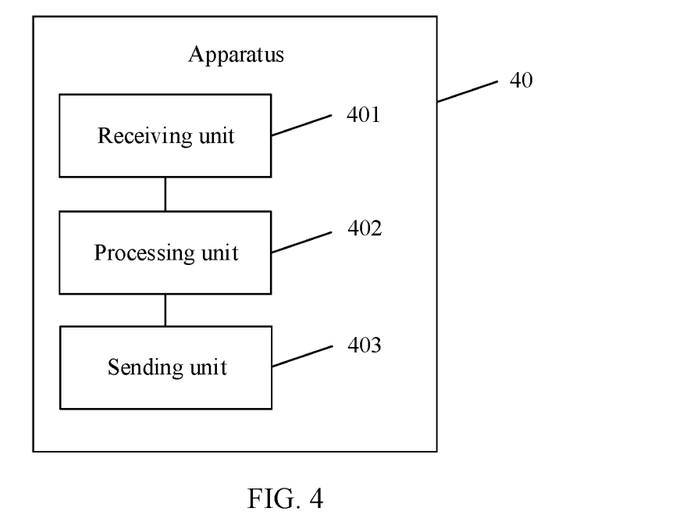
FIG. 4 is a schematic diagram of an embodiment of a second device according to the embodiments of the present invention.

Embodiment 4 of this application provides an apparatus 40. The apparatus 40 may be a second device, or may be a functional unit or an element, for example, a chip, in the second device. The second device is the second device in Embodiment 1 or Embodiment 2. As described in Embodiment 1, the second device may be an access network device, for example, an eNB, a gNB, or an E-UTRAN, but is not limited thereto. As shown in FIG. 4, the apparatus 40 may include:

a receiving unit 401, configured to receive a first paging message from a first device, where the first paging message includes an identifier of a terminal device and a first parameter, the first parameter corresponds to first wake-up signal WUS configuration information in at least one piece of WUS configuration information, and the first WUS configuration information includes information about a first WUS time-frequency resource; for understanding, refer to step 102 in Embodiment 1 or step 202 in Embodiment 2, and details are not described herein again;

a processing unit 402, configured to determine a value range of the first parameter based on the first parameter and at least one preset threshold; for understanding, refer to step 106 in Embodiment 1, and details are not described herein again, where the processing unit 402 is further configured to determine the first WUS configuration information in the at least one piece of WUS configuration information based on the value range of the first parameter, where a preset correspondence exists between the value range of the first parameter and the first WUS configuration information; for understanding, refer to step 106 in Embodiment 1, and details are not described herein again;

the processing unit 402 is further configured to determine the first WUS time-frequency resource based on the first WUS configuration information; for understanding, refer to step 107 in Embodiment 1 or step 207 in Embodiment 2, and details are not described herein again; and the processing unit 402 is further configured to determine the first WUS configuration information in the at least one piece of WUS configuration information based on the first parameter, where a preset correspondence exists between the first parameter and the first WUS configuration information; for understanding, refer to step 206 in Embodiment 2, and details are not described herein again; and a sending unit 403, configured to send a first WUS to the terminal device on the first WUS time-frequency resource, where the first WUS is used to wake up the terminal device, and after the terminal device is woken up, the terminal device monitors a physical downlink control channel PDCCH on a first paging occasion PO; for understanding, refer to step 108 in Embodiment 1 or step 208 in Embodiment 2, and details are not described herein again; and the sending unit 403 is further configured to send the at least one piece of WUS configuration information to the terminal device; for understanding, refer to step 103 in Embodiment 1 or step 203 in Embodiment 2, and details are not described herein again.

The apparatus 40 provided in Embodiment 4 lists only the receiving unit 401, the processing unit 402, and the sending unit 403. In actual production, there may be another functional module. This embodiment is merely an example, and constitutes no limitation.

Figure 5:
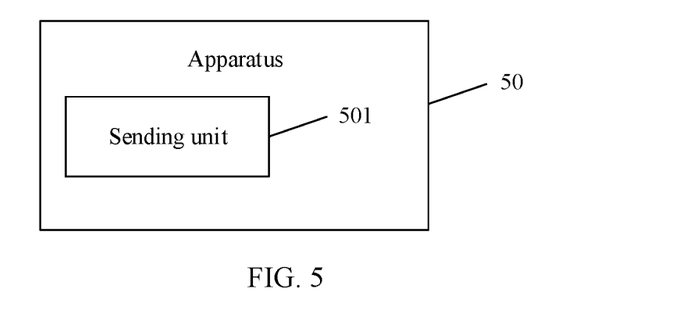
FIG. 5 is a schematic diagram of an embodiment of a first device according to the embodiments of the present invention.

Embodiment 5 of this application provides an apparatus 50. The apparatus 50 may be a first device, or may be a functional unit or an element, for example, a chip, in the first device. The first device is the first device in Embodiment 1 or Embodiment 2. As described in Embodiment 1, the first device may be a core network device, for example, an MME or an AMF, but is not limited thereto. As shown in FIG. 5, the apparatus 50 may include:

a sending unit 501, configured to send a first parameter to a terminal device, where the first parameter corresponds to first wake-up signal WUS configuration information in at least one piece of WUS configuration information, and the first WUS configuration information includes information about a first WUS time-frequency resource; for understanding, refer to step 101 in Embodiment 1 or step 201 in Embodiment 2, and details are not described herein again, where the sending unit 501 is further configured to send a first paging message to a second device, where the first paging message includes an identifier of the terminal device and the first parameter, and the first paging message is used to indicate the second device to page the terminal device; for understanding, refer to step 102 in Embodiment 1 or step 202 in Embodiment 2, and details are not described herein again.

The apparatus 50 provided in Embodiment 5 lists only the sending unit 501. In actual production, there may be another functional module. This embodiment is merely an example, and constitutes no limitation.

Figure 6:
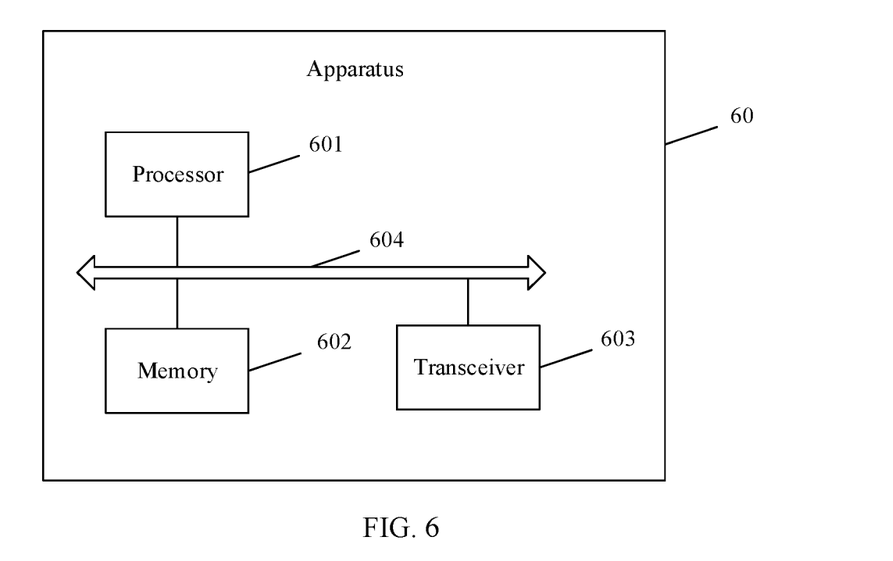
FIG. 6 is a schematic diagram of another embodiment of a terminal device according to the embodiments of the present invention.

Refer to FIG. 6. Embodiment 6 of this application provides an apparatus 60. The apparatus 60 may be a terminal device, or may be a functional unit or an element, for example, a chip, in the terminal device. As shown in FIG. 6, the apparatus 60 includes a processor 601, a memory 602, and a transceiver 603. The processor 601, the memory 602, and the transceiver 603 are connected.

The apparatus 60 may be UE, an internet of things device, or the like, but is not limited thereto. The apparatus 60 is an apparatus of a hardware structure, and may be configured to implement functions implemented by the functional units in the apparatus 30 shown in FIG. 3. For example, persons skilled in the art may figure out that the processing unit 302 in the apparatus 30 shown in FIG. 3 may be implemented by the processor 601 by invoking code in the memory 602, and the receiving unit 301 in the apparatus 30 shown in FIG. 3 may be implemented by the transceiver 603.

Optionally, the foregoing processor 601 may be one or more central processing units (CPU), a microprocessor, an application-specific integrated circuit (ASIC), or one or more integrated circuits configured to control program execution of the solutions in this application.

The processor 601 is configured to execute instructions in the memory 602, to perform the foregoing processing step performed by the terminal device in the communication method shown in FIG. 1, or perform the step performed by the terminal device in the communication method shown in FIG. 2.

The memory 602, the processor 601, and the transceiver 603 may be connected to each other through a bus 604, but is not limited to being connected only through the bus 604. The bus 604 may be a peripheral component interconnect (PCI) bus, an extended industry standard architecture (EISA) bus, or the like. Buses may be classified into an address bus, a data bus, a control bus, and the like.

In a specific embodiment, the transceiver 603 is configured to receive a first parameter from a first device. For details, refer to the detailed descriptions of step 101 in Embodiment 1 shown in FIG. 1. The transceiver 603 is further configured to perform all the steps performed by the receiving unit 301 in Embodiment 3. Details are not described herein again.

The processor 601 is configured to determine a first WUS time-frequency resource based on the first parameter. For details, refer to the detailed descriptions of step 104 and step 105 in Embodiment 1 shown in FIG. 1. The processor 601 is further configured to perform all the steps performed by the processing unit 302 in Embodiment 3. Details are not described herein again.

Figure 7:
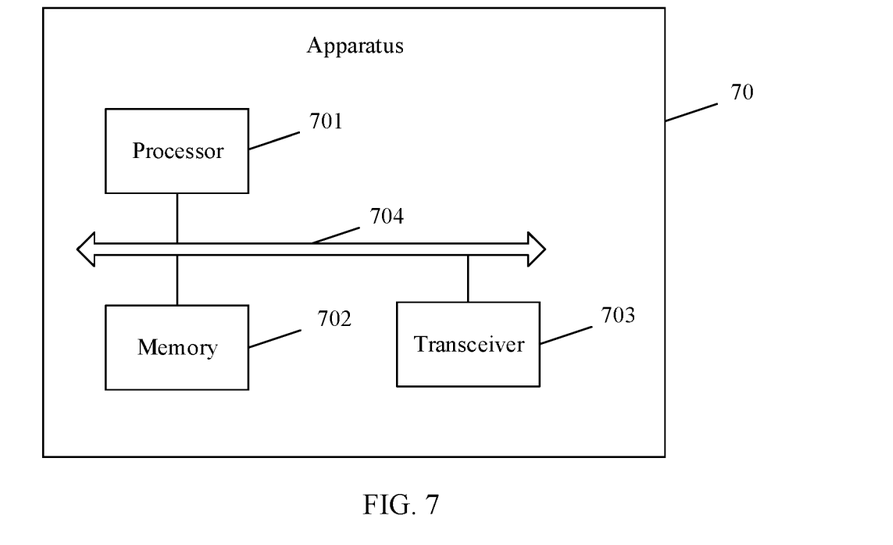
FIG. 7 is a schematic diagram of another embodiment of a second device according to the embodiments of the present invention.

Refer to FIG. 7. Embodiment 7 of this application provides an apparatus 70. The apparatus 70 may be a second device, or may be a functional unit or an element, for example, a chip, in the second device. As shown in FIG. 7, the apparatus 70 includes a processor 701, a memory 702, and a transceiver 703. The processor 701, the memory 702, and the transceiver 703 are connected.

The second device may be an access network device, for example, an eNB, a gNB, or an E-UTRAN, but is not limited thereto. The apparatus 70 is an apparatus of a hardware structure, and may be configured to implement functions of the functional modules in the apparatus 40 described in Embodiment 4. For example, persons skilled in the art may figure out that the processing unit 402 in the apparatus 40 shown in FIG. 4 may be implemented by the processor 701 by invoking code in the memory 702, and the receiving unit 401 and the sending unit 403 in the apparatus 40 shown in FIG. 4 may be implemented by the transceiver 703.

Optionally, the foregoing processor 701 may be one or more central processing units (CPU), a microprocessor, an application-specific integrated circuit (ASIC), or one or more integrated circuits configured to control program execution of the solutions in this application.

The processor 701 is configured to execute instructions in the memory 702, to perform the foregoing processing step performed by the second device in the communication method shown in FIG. 1, or perform the step performed by the second device in the communication method shown in FIG. 2.

The memory 702, the processor 701, and the transceiver 703 may be connected to each other through a bus 704, but is not limited to being connected only through the bus 704. The bus 704 may be a peripheral component interconnect (PCI) bus, an extended industry standard architecture (EISA) bus, or the like. Buses may be classified into an address bus, a data bus, a control bus, and the like.

In a specific embodiment, the transceiver 703 is configured to receive a first paging message from a first device. For details, refer to the detailed descriptions of step 102 in Embodiment 1 shown in FIG. 1. The transceiver 703 is further configured to perform all the steps performed by the receiving unit 401 in Embodiment 4. Details are not described herein again.

In a specific embodiment, the processor 701 is configured to determine a value range of a first parameter based on the first parameter and at least one preset threshold. For details, refer to the detailed descriptions of step 106 in Embodiment 1 shown in FIG. 1. The processor 701 is further configured to perform all the steps performed by the processing unit 402 in Embodiment 4. Details are not described herein again.

In a specific embodiment, the transceiver 703 is configured to send a first WUS to a terminal device on a first WUS time-frequency resource. For details, refer to the detailed descriptions of step 108 in the embodiment shown in FIG. 1. The transceiver 703 is further configured to perform all the steps performed by the sending unit 403 in Embodiment 4. Details are not described herein again.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, all or some of the procedures or the functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

Persons of ordinary skill in the art may understand that all or some of the steps of the methods in the embodiments may be implemented by a program instructing related hardware. The program may be stored in a computer-readable storage medium. The storage medium may include a ROM, a RAM, a magnetic disk, an optical disc, or the like.

The foregoing detailed descriptions are about the communication method and the related device provided in the embodiments of the present invention. Specific cases are used for illustrating principles and implementations of the present invention. The foregoing descriptions about the embodiments are merely for understanding the methods and the core idea of the present invention. In addition, persons of ordinary skill in the art may make modifications to the specific implementations and application scopes based on the idea of the present invention. In conclusion, the content of this specification should not be construed as a limitation on the present invention. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A communication method, comprising:
receiving an attach accept message or a tracking area update accept message from a core network device, wherein the attach accept message or the tracking area update accept message comprises a first paging probability V, the first paging probability V corresponds to first wake-up signal (WUS) configuration information in at least one piece of WUS configuration information, and the first WUS configuration information comprises information about a first WUS time-frequency resource;
receiving a system message from an access network device, wherein the system message comprises M thresholds comprising $T_1, T_2, \ldots,$ and $T_M$;
determining an index of the first WUS configuration information corresponding to a first value range, wherein the first value range is determined based on the first paging probability V and the M thresholds, the first value range corresponding to the first paging probability V;
determining the first WUS configuration information based on the index of the first WUS configuration information; and
receiving a first WUS from the access network device on the first WUS time-frequency resource, wherein the first WUS is used to wake up a terminal device, and M is a positive integer.

2. The communication method according to claim 1, wherein the M thresholds are M paging probability thresholds, the M paging probability thresholds correspond to M+1 paging probability value ranges, and the M+1 paging probability value ranges correspond to indexes of M+1 pieces of WUS configuration information.

3. The communication method according to claim 2, wherein
the M paging probability thresholds include $T_1, T_2, \ldots, T_{M-1},$ and $T_M$, wherein $T_1 \leq T_2 \leq \ldots \leq T_{M-1} \leq T_M$, the M+1 paging probability value ranges include $V \leq T_1$, $T_1 < V \leq T_2, \ldots, T_{M-1} < V \leq T_M$ and $T_M < V$, the M+1 paging probability value ranges correspond one-to-one to the indexes of the M+1 pieces of WUS configuration information, and the indexes of the M+1 pieces of WUS configuration information correspond one-to-one to the M+1 pieces of WUS configuration information.

4. The communication method according to claim 1, wherein the communication method further comprises:
receiving first information from the access network device, wherein the first information is used to indicate a correspondence between at least one paging probability value range and an index of the at least one piece of WUS configuration information.

5. The communication method according to claim 1, wherein the determining an index of the first WUS configuration information corresponding to the first value range comprises:
determining an index of first-level WUS configuration information corresponding to the first value range, wherein the index of the first-level WUS configuration information comprises an index of at least one piece of second-level WUS configuration information, and the index of the at least one piece of second-level WUS configuration information corresponds one-to-one to the at least one piece of WUS configuration information; and
determining the index of the first WUS configuration information in the index of the at least one piece of second-level WUS configuration information based on an identifier of the terminal device.

6. A communication method, comprising:
receiving a first paging message from a core network device, wherein the first paging message comprises an identifier of a terminal device and a first paging probability V, the first paging probability V corresponds to first wake-up signal (WUS) configuration information in at least one piece of WUS configuration information, and the first WUS configuration information comprises information about a first WUS time-frequency resource;
sending a system message to the terminal device, wherein the system message comprises M thresholds comprising $T_1, T_2, \ldots,$ and $T_M$, wherein the M thresholds are M paging probability thresholds, the M paging probability thresholds correspond to M+1 paging probability value ranges, and the M+1 paging probability value ranges correspond to indexes of M+1 pieces of WUS configuration information; and
sending a first WUS to the terminal device on the first WUS time-frequency resource, wherein the first WUS is used to wake up the terminal device.

7. The communication method according to claim 6, wherein the M paging probability thresholds include $T_1, T_2, \ldots, T_{M-1},$ and $T_M$, wherein $T_1 \leq T_2 \leq \ldots \leq T_{M-1} \leq T_M$, the M+1 paging probability value ranges include $V \leq T_1$, $T_1 < V \leq T_2, \ldots, T_{M-1} < V \leq T_M$ and $T_M < V$, the M+1 paging probability value ranges correspond one-to-one to the indexes of the M+1 pieces of WUS configuration information, and the indexes of the M+1 pieces of WUS configuration information correspond one-to-one to the M+1 pieces of WUS configuration information.

8. The communication method according to claim 6, wherein the communication method further comprises:
sending first information to the terminal device, wherein the first information is used to indicate a correspondence between at least one paging probability value range and an index of the at least one piece of WUS configuration information.

9. The communication method according to claim 6, wherein before the sending a first WUS to the terminal device on the first WUS time-frequency resource, the communication method further comprises:

determining the first WUS configuration information in the at least one piece of WUS configuration information based on the first paging probability V, wherein a preset correspondence exists between the first paging probability V and the first WUS configuration information.

10. An apparatus, comprising:

one or more processors; and one or more memories coupled to the one or more processors and storing program instructions for execution by the one or more processors to:

receive an attach accept message or a tracking area update accept message from a core network device, wherein the attach accept message or the tracking area update accept message comprises a first paging probability V, the first paging probability V corresponds to first wake-up signal (WUS) configuration information in at least one piece of WUS configuration information, and the first WUS configuration information comprises information about a first WUS time-frequency resource;

receive a system message from an access network device, wherein the system message comprises M thresholds comprising $T_1, T_2, \ldots,$ and $T_M$;

determine an index of the first WUS configuration information corresponding to a first value range, wherein the first value range is determined based on the first paging probability V and the M thresholds, the first value range corresponding to the first paging probability V;

determine the first WUS configuration information based on the index of the first WUS configuration information; and     receive a first WUS from the access network device on the first WUS time-frequency resource, wherein the first WUS is used to wake up a terminal device, and M is a positive integer.

11. The apparatus according to claim 10, wherein the M thresholds are M paging probability thresholds, the M paging probability thresholds correspond to M+1 paging probability value ranges, and the M+1 paging probability value ranges correspond to indexes of M+1 pieces of WUS configuration information.

12. The apparatus according to claim 11, wherein the M paging probability thresholds include $T_1, T_2, \ldots, T_{M-1},$ and $T_M,$ wherein $T_1 \leq T_2 \leq \ldots \leq T_{M-1} \leq T_M,$ the M+1 paging probability value ranges include $V \leq T_1,$ $T_1 < V \leq T_2, \ldots, T_{M-1} < V \leq T_M$ and $T_M < V,$ the M+1 paging probability value ranges correspond one-to-one to the indexes of the M+1 pieces of WUS configuration information, and the indexes of the M+1 pieces of WUS configuration information correspond one-to-one to the M+1 pieces of WUS configuration information.

13. The apparatus according to claim 10, wherein the one or more memories store the program instructions for execution by the one or more processors to:

receive first information from the access network device, wherein the first information is used to indicate a correspondence between at least one paging probability value range and an index of the at least one piece of WUS configuration information.

14. The apparatus according to claim 10, wherein the determine an index of the first WUS configuration information corresponding to the first value range comprises:

determine an index of first-level WUS configuration information corresponding to the first value range, wherein the index of the first-level WUS configuration information comprises an index of at least one piece of second-level WUS configuration information, and the index of the at least one piece of second-level WUS configuration information corresponds one-to-one to the at least one piece of WUS configuration information; and     determine the index of the first WUS configuration information in the index of the at least one piece of second-level WUS configuration information based on an identifier of the terminal device.

15. An apparatus, comprising:

at least one processor; and one or more memories coupled to the at least one processor and storing program instructions for execution by the at least one processor to:

receive a first paging message from an access network device, wherein the first paging message comprises an identifier of a terminal device and a first paging probability V, the first paging probability V corresponds to first wake-up signal (WUS) configuration information in at least one piece of WUS configuration information, and the first WUS configuration information comprises information about a first WUS time-frequency resource;

send a system message to the terminal device, wherein the system message comprises M thresholds comprising $T_1, T_2, \ldots,$ and $T_M,$ wherein the M thresholds are M paging probability thresholds, the M paging probability thresholds correspond to M+1 paging probability value ranges, and the M+1 paging probability value ranges correspond to indexes of M+1 pieces of WUS configuration information; and     send a first WUS to the terminal device on the first WUS time-frequency resource, wherein the first WUS is used to wake up the terminal device.

16. The apparatus according to claim 15, wherein the M paging probability thresholds include $T_1, T_2, \ldots, T_{M-1},$ and $T_M,$ wherein $T_1 \leq T_2 \leq \ldots \leq T_{M-1} \leq T_M,$ the M+1 paging probability value ranges include $V \leq T_1,$ $T_1 < V \leq T_2, \ldots, T_{M-1} < V \leq T_M$ and $T_M < V,$ the M+1 paging probability value ranges correspond one-to-one to the indexes of the M+1 pieces of WUS configuration information, and the indexes of the M+1 pieces of WUS configuration information correspond one-to-one to the M+1 pieces of WUS configuration information.

17. The apparatus according to claim 15, wherein the one or more memories store the program instructions for execution by the at least one processor to:

send first information to the terminal device, wherein the first information is used to indicate a correspondence between at least one paging probability value range and an index of the at least one piece of WUS configuration information.

18. The apparatus according to any one of claim 15, wherein the one or more memories store the program instructions for execution by the at least one processor to:

determine the first WUS configuration information in the at least one piece of WUS configuration information based on the first paging probability V, wherein a preset correspondence exists between the first paging probability V and the first WUS configuration information.

\* \* \* \* \*

UNITED STATES PATENT AND TRADEMARK OFFICE
CERTIFICATE OF CORRECTION

PATENT NO. : 12,150,056 B2
APPLICATION NO. : 17/671385
DATED : November 19, 2024
INVENTOR(S) : Hong Wang et al.

It is certified that error appears in the above-identified patent and that said Letters Patent is hereby corrected as shown below:

In the Claims

In Column 25, In Line 64, In Claim 3, delete "$T_1 \leq V \leq T_2$," and insert -- $T_1 < V \leq T_2$, --.

In Column 25, In Line 64, In Claim 3, delete "$T_{M-1} \leq V \leq T_M$" and insert -- $T_{M-1} < V \leq T_M$ --.

In Column 28, In Line 44 (Approx.), In Claim 16, delete "$T_{M-1} \leq V \leq T_M$" and insert -- $T_{M-1} < V \leq T_M$ --.

In Column 28, In Line 58 (Approx.), In Claim 18, before "claim 15," delete "any one of".

Signed and Sealed this
Fourth Day of March, 2025

Coke Morgan Stewart
*Acting Director of the United States Patent and Trademark Office*